US012086245B1

(12) United States Patent
Favor et al.

(10) Patent No.: US 12,086,245 B1
(45) Date of Patent: Sep. 10, 2024

(54) PROCESSOR THAT PREVENTS SPECULATIVE EXECUTION ACROSS TRANSLATION CONTEXT CHANGE BOUNDARIES TO MITIGATE SIDE CHANNEL ATTACKS

(71) Applicant: Ventana Micro Systems Inc., Cupertino, CA (US)

(72) Inventors: John G. Favor, San Francisco, CA (US); David S. Oliver, Providence, UT (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 18/244,795

(22) Filed: Sep. 11, 2023

Related U.S. Application Data

(63) Continuation of application No. 16/937,392, filed on Jul. 23, 2020, now Pat. No. 11,755,731.

(51) Int. Cl.
*G06F 21/54* (2013.01)
*G06F 9/30* (2018.01)
(Continued)

(52) U.S. Cl.
CPC ........ *G06F 21/556* (2013.01); *G06F 9/30047* (2013.01); *G06F 9/3842* (2013.01);
(Continued)

(58) Field of Classification Search
CPC ........ G06F 21/556; G06F 21/54; G06F 21/72; G06F 9/30047; G06F 9/3842; G06F 9/542; G06F 12/1027
See application file for complete search history.

(56) References Cited

U.S. PATENT DOCUMENTS 10,929,141 B1 2/2021 Kaplan et al.
11,231,931 B1 1/2022 Puthoor
(Continued)

OTHER PUBLICATIONS

Abu-Ghazaleh, Nael et al. "How the Spectre and Meltdown Hacks Really Worked." IEEE Spectrum. Downloaded on Nov. 24, 2019 from https://spectrum.ieee.org/computing/hardware/how-the-spectre-andmeltdown-hacks-really-worked. pp. 1-10.
(Continued)

*Primary Examiner* — Daniel B Potratz
(74) *Attorney, Agent, or Firm* — E. Alan Davis; Huffman Law Group, PC

(57) ABSTRACT

A processor for mitigating side channel attacks includes units that perform fetch, decode, and execution of instructions and pipeline control logic. The processor performs speculative and out-of-order execution of the instructions. The units detect and notify the control unit of events that cause a change from a first translation context (TC) to a second TC. In response, the pipeline control logic prevents speculative execution of instructions that are dependent in their execution on the change to the second TC until all instructions that are dependent on the first TC have completed execution, which may involve stalling their dispatch until all first-TC-dependent instructions have at least completed execution, or by tagging them and dispatching them to execution schedulers but preventing them from starting execution until all first-TC-dependent instructions have at least completed execution. The processor may also in response prevent speculative instruction fetching and/or perform speculative instruction flushing.

20 Claims, 3 Drawing Sheets

(51) Int. Cl.
*G06F 9/38* (2018.01)
*G06F 9/54* (2006.01)
*G06F 12/1027* (2016.01)
*G06F 21/55* (2013.01)
*G06F 21/72* (2013.01)

(52) U.S. Cl.
CPC .......... *G06F 9/542* (2013.01); *G06F 12/1027* (2013.01); *G06F 21/54* (2013.01); *G06F 21/72* (2013.01)

(56) References Cited

U.S. PATENT DOCUMENTS

| | | | |
|---|---|---|---|
| 2011/0055484 A1* | 3/2011 | Eichenberger | G06F 9/3834 712/216 |
| 2011/0153986 A1 | 6/2011 | Alexander et al. | |
| 2012/0239904 A1 | 9/2012 | Ekanadham et al. | |
| 2014/0108862 A1 | 4/2014 | Rafacz et al. | |
| 2014/0380023 A1 | 12/2014 | Smaus et al. | |
| 2015/0006452 A1 | 1/2015 | Kim et al. | |
| 2016/0292075 A1 | 10/2016 | Mohan | |
| 2017/0147346 A1 | 5/2017 | Hornung et al. | |
| 2017/0286315 A1 | 10/2017 | Mukherjee et al. | |
| 2019/0114422 A1 | 4/2019 | Johnson et al. | |
| 2019/0138720 A1* | 5/2019 | Grewal | G06F 9/3863 |
| 2019/0227803 A1 | 7/2019 | Mukherjee et al. | |
| 2019/0310845 A1 | 10/2019 | Ramani et al. | |
| 2020/0133679 A1 | 4/2020 | Brandt et al. | |
| 2020/0159677 A1* | 5/2020 | Evans | G06F 12/1036 |
| 2020/0272474 A1* | 8/2020 | Gabor | G06F 12/1027 |
| 2020/0364152 A1 | 11/2020 | Park et al. | |
| 2020/0401441 A1 | 12/2020 | Evans et al. | |
| 2021/0049015 A1 | 2/2021 | Chou et al. | |
| 2021/0081575 A1 | 3/2021 | Saileshwar et al. | |
| 2021/0157590 A1 | 5/2021 | King et al. | |
| 2021/0157597 A1 | 5/2021 | Grubisic | |
| 2021/0200552 A1 | 7/2021 | Liu et al. | |
| 2021/0248084 A1 | 8/2021 | Mendelson et al. | |
| 2021/0303303 A1 | 9/2021 | Schuttenberg et al. | |
| 2021/0365554 A1 | 11/2021 | Sakalis et al. | |
| 2022/0027459 A1 | 1/2022 | Favor et al. | |
| 2022/0027460 A1 | 1/2022 | Favor | |
| 2022/0027467 A1 | 1/2022 | Favor et al. | |
| 2022/0027468 A1 | 1/2022 | Favor | |

OTHER PUBLICATIONS

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

Frogh, Anders et al. "Wrangling the Ghost: An Inside Story of Mitigating Speculative Execution Side Channel Vulnerabilities." Microsoft. Downloaded on Nov. 24, 2019 from https://i.blackhat.com/us-18/Thu-August-9/us-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983-001. pp. 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." *Journal of Cryptographic Engineering 8*, Apr. 2018. pp. 1-37.

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.

\* cited by examiner

FIG. 5

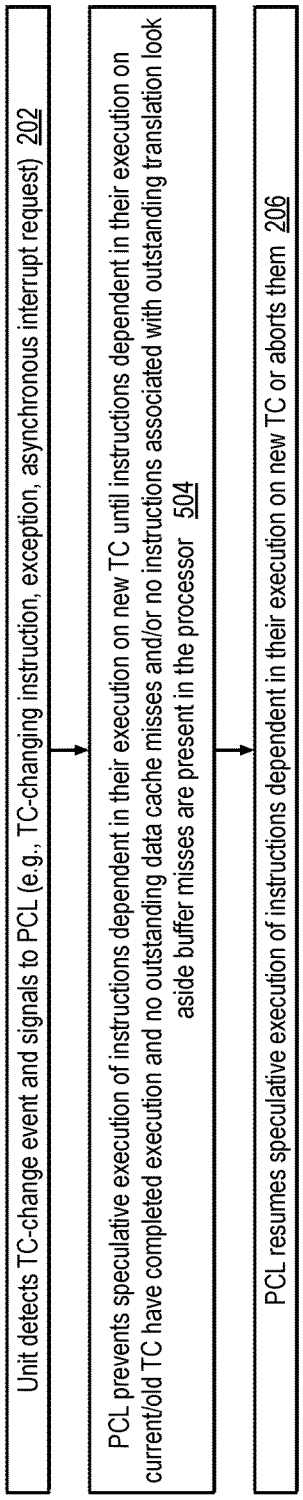

Unit detects TC-change event and signals to PCL (e.g., TC-changing instruction, exception, asynchronous interrupt request) 202

→ PCL prevents speculative execution of instructions dependent in their execution on new TC until instructions dependent in their execution on current/old TC have completed execution and no outstanding data cache misses and/or no instructions associated with outstanding translation look aside buffer misses are present in the processor 504

→ PCL resumes speculative execution of instructions dependent in their execution on new TC or aborts them 206

FIG. 6

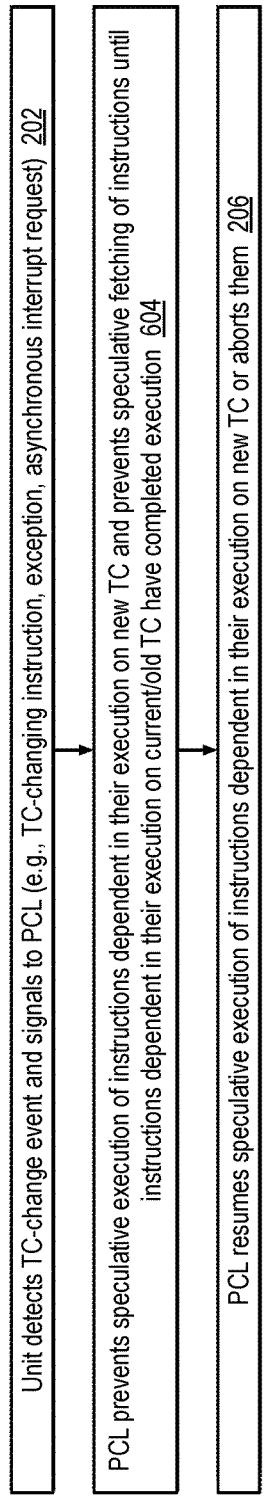

Unit detects TC-change event and signals to PCL (e.g., TC-changing instruction, exception, asynchronous interrupt request) 202

→ PCL prevents speculative execution of instructions dependent in their execution on new TC and prevents speculative fetching of instructions until instructions dependent in their execution on current/old TC have completed execution 604

→ PCL resumes speculative execution of instructions dependent in their execution on new TC or aborts them 206

FIG. 7

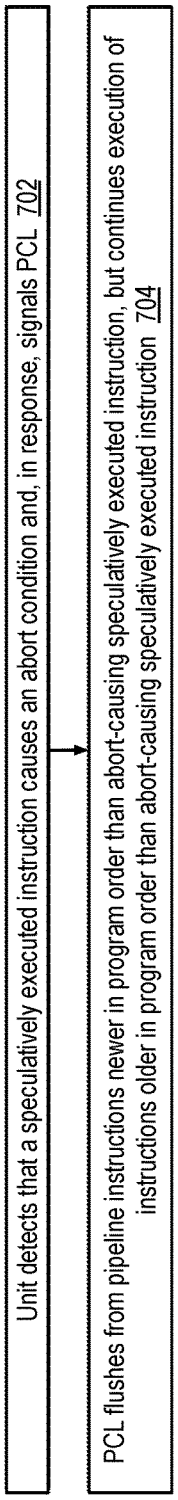

Unit detects that a speculatively executed instruction causes an abort condition and, in response, signals PCL 702

→ PCL flushes from pipeline instructions newer in program order than abort-causing speculatively executed instruction, but continues execution of instructions older in program order than abort-causing speculatively executed instruction 704

PROCESSOR THAT PREVENTS SPECULATIVE EXECUTION ACROSS TRANSLATION CONTEXT CHANGE BOUNDARIES TO MITIGATE SIDE CHANNEL ATTACKS

CROSS-REFERENCE TO RELATED APPLICATIONS

This application is a continuation of U.S. patent application Ser. No. 16/937,392 filed on Jul. 23, 2020 which is incorporated by reference herein in its entirety.

TECHNICAL FIELD

This application relates to microprocessors, and in particular to modifications made to thwart microarchitecture-level side-channel attacks.

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attack. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system (OS)'s shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2[index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1 [index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1. However, because the branch predictor has been maliciously mis-trained, it predicts that the malicious index1 value is in the bounds of array 1 (i.e., index1<array1size). Therefore, the processor speculatively executes "array1 [index1]" using the malicious index1 value. This results in the secret data byte value being loaded from the out-of-bounds location in the victim's memory into a register of the processor, namely from the address of the secret data byte.

Because the attacker flushed the value of array1_size from cache prior to invoking the victim code, the processor must bring in array1_size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2 [probe_value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array (4) through speculative execution because of the branch prediction, indexing the first array with the malicious value in order to retrieve the secret byte; (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache liens, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "RIDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an op is committed to cache memory, it is temporarily stored in a store buffer—a table of address, value, and "is valid" entries. Speculative store-to-load forwarding logic enables the store buffer to forward store data to be used as operands in younger ops. Fallout exploits this to monitor recent stores performed by other programs, containers, operating systems, and virtual machines running on the same hardware thread.

The RIDL or MFBDS variant exploits the design of fill buffers in some processors that support hyper-threading. Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious op even as the load port data is in-flight to the register file. Because a single pass of this attack may recover only some of the bits, the attack may be run repeatedly to probabilistically discover a more complete set of data.

SUMMARY

In one embodiment, the present disclosure provides a processor for mitigating side channel attacks. The processor includes a pipeline of units that perform fetch, decode, and execution of instructions. The processor also includes pipeline control logic coupled to the pipeline units. The processor is configured to perform speculative execution of the instructions. The processor is also configured to execute the instructions out of program order. The units are configured to detect and notify the pipeline control unit of events that cause a change from a first translation context to a second translation context. In response to notification of the translation context change events, the pipeline control logic prevents speculative execution of instructions that are dependent in their execution on the change to the second translation context until all instructions that are dependent on the first translation context have completed execution.

In another embodiment, the present disclosure provides a method for mitigating side channel attacks in a processor that performs speculative execution of instructions, executes instructions out of program order, and includes a pipeline of units that perform fetch, decode, and execution of instructions and pipeline control logic coupled to the pipeline units. The method includes detecting and notifying, by the units, the pipeline control unit of events that cause a change from a first translation context to a second translation context. The method also includes preventing, by the pipeline control logic in response to notification of the translation context change events, speculative execution of instructions that are dependent in their execution on the change to the second translation context until all instructions that are dependent on the first translation context have completed execution.

In yet another embodiment, the present disclosure provides a non-transitory computer-readable medium having instructions stored thereon that are capable of causing or configuring a processor for mitigating side channel attacks. The processor also includes pipeline control logic coupled to the pipeline units. The processor is configured to perform speculative execution of the instructions. The processor is configured to execute the instructions out of program order. The units are configured to detect and notify the pipeline control unit of events that cause a change from a first translation context to a second translation context. In response to notification of the translation context change events, the pipeline control logic prevents speculative execution of instructions that are dependent in their execution on the change to the second translation context until all instructions that are dependent on the first translation context have completed execution.

Other systems, devices, methods, features, and advantages will become apparent to one with skill in the art upon examination of this disclosure. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

FIGS. 2 through 7 are example flow diagrams illustrating operation of the core of FIG. 1 in accordance with embodiments of the present disclosure.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (e.g., spatial dimensions) may be used explicitly or implicitly herein as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

In describing preferred and alternate embodiments of the technology described herein, specific terminology is employed for the sake of clarity. Technology described herein, however, is not intended to be limited to the specific terminology so selected, and it is to be understood that each specific element includes all technical equivalents that operate similarly to accomplish similar functions.

As may be observed from the foregoing, SCAs prey on processors that engage in speculative execution of instructions. Stated alternatively, speculative execution is a critical component to SCA vulnerability. However, speculative execution significantly improves processor performance. Therefore, high performance processors must continue to engage in speculative execution. Embodiments are described herein that mitigate SCAs by allowing speculative execution, but limiting it in response to particular events, which may be relatively infrequent, but which may be indicative of or associated with an attempt to exploit speculative execution. More specifically, the events include those that change the translation context of the processor, as described in more detail below.

Figure 1:
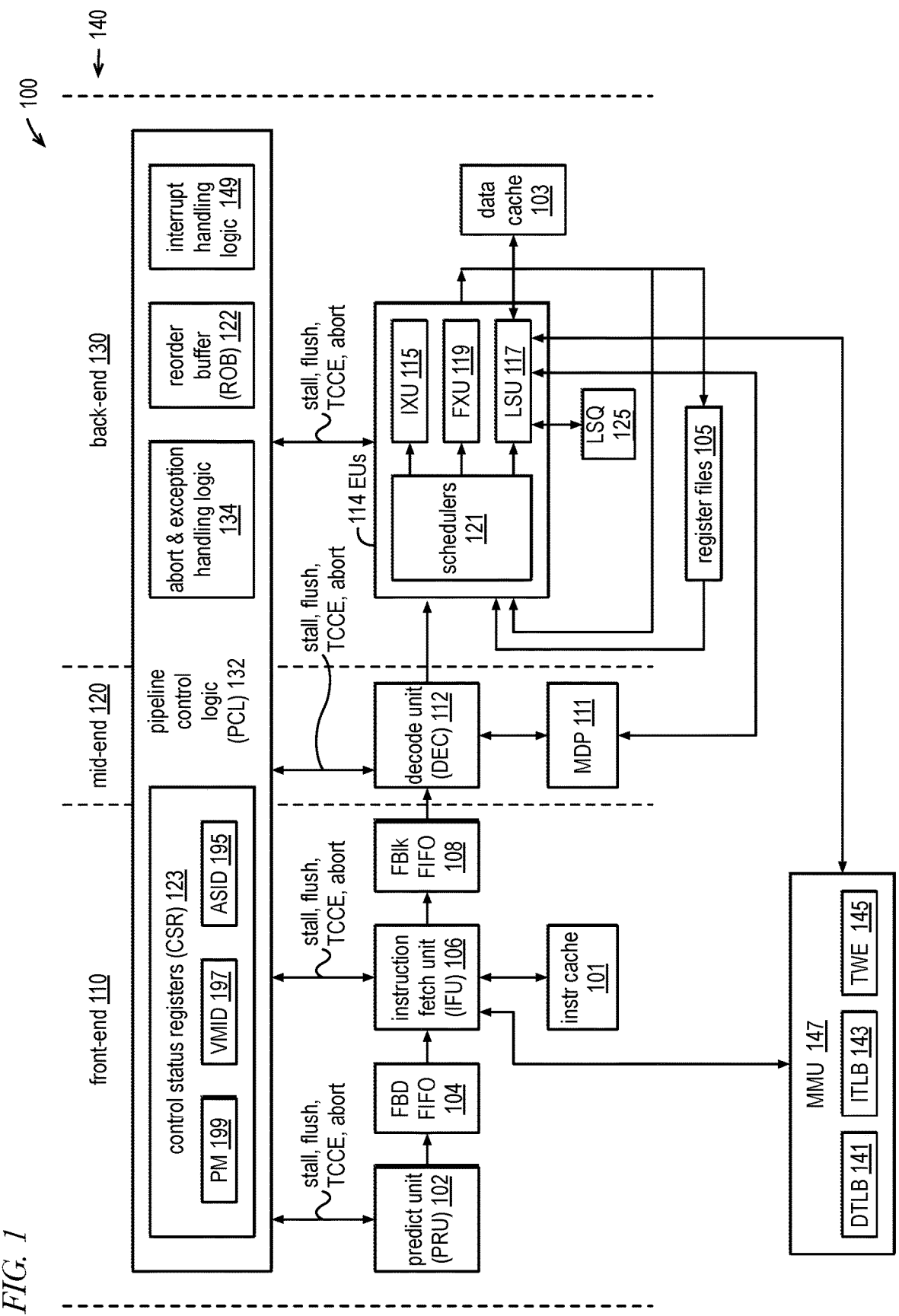
FIG. 1 is an example block diagram of a pipelined super-scalar, out-of-order execution microprocessor core 100 that performs speculative execution in accordance with an embodiment of the present disclosure.

FIG. 1 is a block diagram of a pipelined super-scalar, out-of-order execution microprocessor core 100 that performs speculative execution in accordance with an embodiment of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs, as described herein. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The LSQ 125 hold speculatively executed load/store Ops until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed, as described in more detail below, e.g., with respect to FIG. 7. The microprocessor 110 may also include other blocks not shown, such as a write combining buffer, a load buffer, a bus interface unit, and various levels of cache memory above the instruction cache 101 and data cache 103, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein, a translation context (TC) of the core 100 (or of a hardware thread in the case of a multi-threaded core) is a function of the ASID, VMID, and/or PM of the processor. Embodiments are described in which the core 100 advantageously detects and prevents speculative execution across TC change boundaries to mitigate SCAs. In one embodiment, a change to the TC comprises a change to the ASID. In one embodiment, a change to the TC comprises a change to the VMID. In one embodiment, a change to the TC comprises a change to the PM. In one embodiment, a change to the TC comprises a change to the ASID and/or VMID. In one embodiment, a change to the TC comprises a change to the ASID and/or PM. In one embodiment, a change to the TC comprises a change to the VMID and/or PM. In one embodiment, a change to the TC comprises a change to the ASID, VMID and/or PM.

A translation regime (TR) is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses. In one embodiment, a change to the TC comprises a change to the TR; however, changes to the PM that do not change the TR are not changes to the TC.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each TR or PM.

As shown in FIG. 1, various units of the pipeline 140 (e.g., PRU 102, IFU 106, DEC 112, EUs 114) may signal a TC-changing event (TCCE) to the PCL 132. In response, the PCL 132 may assert stall signals to selectively stall the units in order to prevent speculative execution of instructions dependent in their execution on the new TC until instructions dependent in their execution on the old/current TC have completed execution, as described in more detail below.

Additionally, the PCL 132 may assert flush signals to selectively flush instructions/Ops from the various units of the pipeline 140, as described herein. Additionally, the pipeline units may signal a need for an abort, as described in more detail below, e.g., in response to detection of a mis-prediction or other microarchitectural exception, architectural exception, or interrupt. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism is also used for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, only the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and abort recoveries may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each EU 114 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, the ROB 122 tracks three stages of instructions, e.g., issue, execute, and write result, in accordance with Tomasulo's algorithm, described in R. M. Tomasulo, "An Efficient Algorithm for Exploiting Multiple Arithmetic Units," IBM Journal, January 1967, pp 25-33, which is herein incorporated by reference for all purposes, or a modified version of Tomasulo's algorithm. Because the ROB 122 retires all Ops and their associated instructions in program order, some Ops may complete execution many cycles before they can be retired or aborted, e.g., a speculatively executed instruction that must be aborted due to detection of a mis-prediction. For example, a speculatively executed instruction that loads a secret data byte could complete before the processor detects a mis-prediction. For another example, a speculatively executed instruction that uses the secret data byte value to modify a previously flushed cache that becomes a side channel to be probed by an SCA to detect the secret data byte could complete before the processor detects the mis-prediction. However, advantageously, embodiments are described in which the core 100 detects a TC-changing event and responsively prevents speculative execution of instructions whose execution depends on the new TC until the instructions whose execution depends on the old/current TC have completed their execution.

Figure 2:
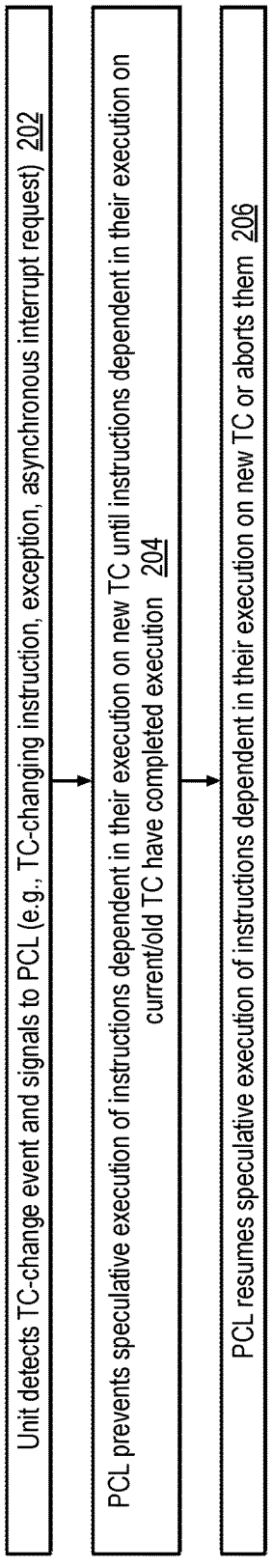

Before proceeding to FIG. 2, it is to be understood that the block diagram of FIG. 1 does not imply a strict demarcation of what each unit does or a strict structural separation between the units shown. Some elements are universally understood to be a part of a particular pipeline unit, but others may not be. For example, whether a scheduler is part of a decode unit, an execution unit, a ROB, or is distinct from all three, or whether a MDP is part of the decode unit, a load-store unit, or distinct from both, is determined more by pedagogical convenience than by rigid semantic demarcations.

FIG. 2 is a flow diagram illustrating operation of the core 100 of FIG. 1 in accordance with an embodiment of the present disclosure. Operation begins at block 202.

At block 202, a unit (e.g., PRU 102, IFU 106, DEC 112, EUs 114) detects an event that changes the TC of the core 100. The unit signals the TC-changing event to the PCL 132. The TC-changing event may include, but is not limited to, an instruction that changes the TC, an exception, and an interrupt request (e.g., an asynchronous interrupt request from an interrupt signal into the core 100).

A TC-changing instruction may change the PM, the ASID, and/or the VMID according to different embodiments, as described above. Such an instruction may explicitly or implicitly update one or more of the PM 199, VMID 197 and/or ASID 195 to accomplish the TC change. Examples of TC-changing instructions include, but are not limited to, a system call or return from system call instruction, a software interrupt, an instruction that enters or exits a virtual machine, an instruction that changes the ASID, VMID, PM, etc. In one embodiment, a TC-changing instruction may write to a CSR 123 that holds the base address of the page table structure, e.g., in the RISC-V ISA, the SATP register associated with the current translation regime.

In one embodiment, the new ASID, VMID and/or PM value is compared against the current value, and if there is no change to the current ASID, VMID and/or PM values, then the unit (e.g., DEC 112) does not signal a TCCE. In an alternate embodiment, as long as the instruction is of a type that has the potential to change the TC, the unit signals a TCCE, even though the instruction may "change" the ASID, VMID and/or PM to the same value as the current value.

Examples of exceptions may include architectural exceptions such as, but not limited to an invalid opcode fault, debug breakpoint, or illegal instruction fault (e.g., insufficient privilege mode) that may be detected by the DEC 112, a page fault that may be detected by the LSU 117, and an attempt to fetch an instruction from a non-executable page or a page the current process does not have permission to access that may be detected by the IFU 106. Examples of exceptions may also include microarchitectural exceptions such as, but not limited to, a detection of a mis-prediction, e.g., by a branch predictor of a direction or target address of a branch instruction, or of a mis-prediction that store data should be forwarded to a load Op in response to a store dependence prediction, e.g., by the MDP 111, as described in more detail below with respect to FIG. 7. As described herein, the predictions made by the predictors give rise to speculative execution, which provides the opportunity for SCAs. Operation proceeds to block 204.

At block 204, the PCL 132 prevents speculative execution of instructions that are dependent in their execution on the new TC (i.e., the TC to which the event changes the TC of the core 100) until instructions dependent in their execution on the old TC (i.e., the current TC prior to the event) have completed their execution. Various embodiments of how the core 100 prevents speculative execution of the new TC-dependent instructions are described in more detail below, e.g., with respect to FIGS. 3 through 6. But first, brief descriptions are provided of instructions with TC-dependent executions and of what it means for an instruction to complete its execution.

An instruction is dependent in its execution on the TC if the architectural result of the instruction could differ depending on the value of the TC. In other words, the instruction is dependent in its execution on the TC if its architectural result could be different if executed under the old/current TC and under the new/changed TC. One example of an instruction with TC-dependent execution is an instruction for which the TC is required to execute the instruction. For an example of an instruction dependent in its execution on the TC, certain instructions, typically referred to as privileged instructions, may only be executed when the PM is at or above a certain level. Thus, when the DEC 112, for example, is decoding a privileged instruction, it must examine the current PM, of which the TC is a function, to determine whether the privileged instruction is for some values of the current PM allowed to complete or is for other values of the current PM an illegal instruction. Although generally in the disclosure, "execution" refers to the processing of an instruction or its associated Op by an EU 114, in the present context of an instruction being dependent upon the TC for its execution, execution may also refer to processing of the instruction performed by other units of the core 100, such as the DEC 112.

For another example, load/store instructions are considered dependent in their execution on their translation context. More specifically, the physical address value into which the load/store address will be translated may vary depending upon the translation tables used, and a change in the value of the ASID, VMID and/or TR is an indication that there is a change in the translation table that will be used to translate load/store addresses into physical addresses (or that no translation will be performed, e.g., RISC-V M mode). Thus, a load/store instruction may be considered effectively dependent in its execution on its TC. Furthermore, an instruction that changes the TC is also an instruction that is dependent in its execution on the TC.

In contrast, other instructions (e.g., many, if not all, arithmetic Ops) may be executed independently of the TC, e.g., the EU 114 is able to perform the arithmetic on input operands from registers and generate the result of the instruction without reference to the TC.

In one embodiment, completion of execution can be said to occur when, or at least as early as, the moment the instruction retires. In an alternative embodiment, completion of execution of an instruction means the instruction (e.g., the Op(s) into which the instruction have been decoded) has been executed by the EUs 114 to the point that there is no longer a possibility of being canceled, retried, replayed, or aborted. Where the ROB 122 also tracks instruction execution completion separately from instruction retirement, completion of execution of an instruction may be signaled by reporting the execution completion to the ROB 122.

The possibility of being cancelled, retried, replayed or aborted is explained in reference to the following. An instruction is canceled if it is stopped from further execution, e.g., while in an EU 114 pipeline after being issued thereto. An instruction, e.g., a load/store Op, is retried when its execution is canceled and made eligible for reissue by the scheduler 121. An instruction is replayed when its execution is canceled and given a status such that it is eligible for reissue by the scheduler 121 at a later point in time, e.g., once any memory operands upon which it is dependent are available. An instruction is aborted when it is flushed from the pipeline 140. After preventing the speculative execution of TC-dependent instructions in block 204, operation proceeds to block 206.

At block 206, the PCL 132 resumes speculative execution of instructions that are dependent in their execution on the new TC. Additionally, in response to some TC-changing events (e.g., some exceptions or an asynchronous interrupt), the abort and exception handling logic 134 may abort (i.e., flush) instructions/Ops that are newer in program order than the instruction/Op causing the exception (and in some cases, the instruction/Op causing the exception is also aborted and does not update architectural state), in which case instructions that are dependent in their execution on the new TC will not be resumed and, advantageously, not speculatively executed.

Figure 3:
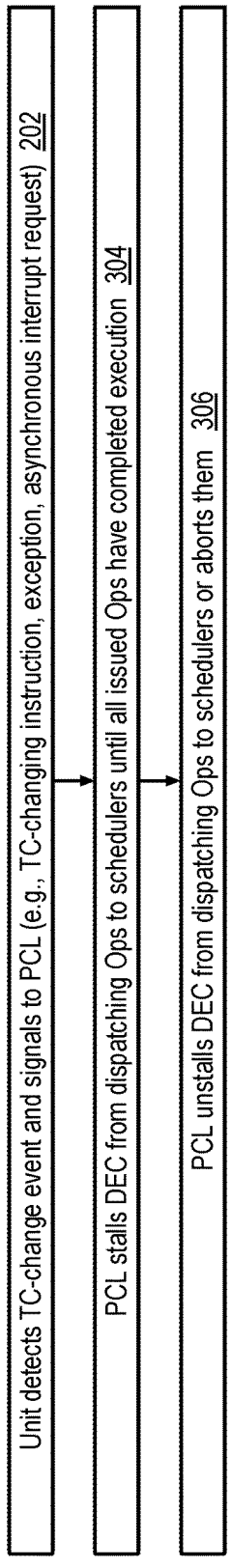

FIG. 3 is a flow diagram illustrating operation of the core 100 of FIG. 1 in accordance with an embodiment of the present disclosure. Operation begins at block 202.

At block 202, a unit detects an event that changes the TC of the core 100 and signals the PCL 132, as in block 202 of FIG. 2. Operation proceeds to block 304.

At block 304, in response to being signaled that a TCCE has been detected, the PCL 132 stalls the DEC 112 from dispatching Ops to the schedulers 121. In one embodiment, the PCL 132 stall the DEC 112 from dispatching Ops until all issued Ops have completed execution. In another embodiment, the PCL 132 stalls the DEC 112 from dispatching Ops until all issued Ops that are dependent in their execution on the current/old TC have completed execution.

In the case in which the TC-changing event is the decoding of a TC-changing instruction by the DEC 112, in one embodiment the DEC 112 stalls dispatch of Ops younger in program order than the TC-changing instruction. This implies that no Ops under the new TC (which includes Ops that are dependent in their execution on the new TC) are dispatched to the EUs 114 and therefore are not speculatively executed. Thus, advantageously while the Ops under the new TC (which includes new TC-dependent Ops) are stalled before execution, the EUs 114 will have the opportunity to determine whether any Op under the current/old TC was the source of potential mis-speculation—e.g., misprediction of an older branch or a secret byte-reading load that causes an exception, e.g., memory protection violation, that raises the need to abort younger dependent Ops—and avoid speculative execution of malicious Ops under the new TC. For example, a load Op of the new TC that would have loaded a cache line using a memory address computed using the secret byte value may be stalled at the DEC 112 and then eventually flushed, rather than speculatively executed, because the core 100 advantageously detected the change in TC, which may be a hint that an SCA was afoot. In one embodiment, the PCL 132 stalls until the ROB 122 is empty, i.e., all dispatched Ops have retired. In one embodiment, the PCL 132 stalls until all Ops in the ROB 122 have completed execution. Operation proceeds to block 306.

At block 306, the PCL 132 un-stalls the DEC 112, i.e., allows the DEC 112 to dispatch Ops to the schedulers 121. Additionally, as described with respect to block 206 above, in response to some TC-changing events, the abort and exception handling logic 134 may abort instructions/Ops that are newer in program order than the instruction/Op causing the exception, in which case the stalled instructions that are dependent in their execution on the new TC will, advantageously, not be not speculatively executed.

Figure 4:
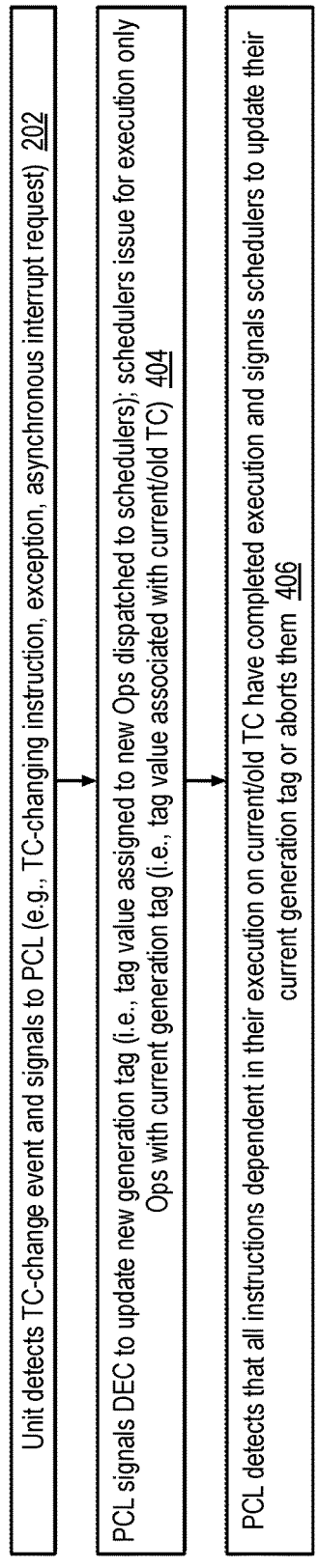

FIG. 4 is a flow diagram illustrating operation of the core 100 of FIG. 1 in accordance with an embodiment of the present disclosure. In the embodiment of FIG. 4, the DEC 112 maintains a new generation tag that is effectively associated with the newest TC, and the schedulers 121 maintain a current/old generation tag that is effectively associated with the current/old TC. Each Op includes a small generation tag. The DEC 112 populates the generation tag of each Op it dispatches with the new generation tag value. The DEC 112 advances its new generation tag value in response to detection of a TC-changing event. Thus, Ops operating under a different TC also operate under a different associated generation tag value. The schedulers 121 advance their current/old generation tag value once all Ops of the current/old generation tag value have completed execution. The schedulers 121 allow Ops of the current/old generation to issue for execution, whereas the schedulers 121 inhibit Ops of newer generations, and therefore different TCs from the current/old generation, from issuing for execution until all Ops of the current/old generation have completed their execution, as described below. Operation begins at block 202.

At block 202, a unit detects an event that changes the TC of the core 100 and signals the PCL 132, as in block 202 of FIG. 2. Operation proceeds to block 404.

At block 404, the PCL 132 signals the DEC 112 to advance its new generation tag with which the DEC 112 tags new Ops it dispatches to the schedulers 121. That is, Ops dispatched to the schedulers 121 after detection of a TC-changing event have a generation tag that is different than the generation tag of dispatched Ops associated with a previous TC. In one embodiment, the new generation tag is advanced by incrementing the tag in a wraparound fashion. The schedulers 121 are configured to issue for execution to the execution pipeline portion of the relevant EU 114 only Ops whose generation tag value matches or is older than the current generation tag value, which prevents speculative execution of Ops whose TC is different from or newer than the TC associated with the current generation tag value. Operation proceeds to block 406.

At block 406, the PCL 132 detects that all Ops having the current generation tag value have completed execution. In one embodiment, the PCL 132 detects that all Ops dependent in their execution upon the current/old TC have completed execution. In response, the PCL 132 signals the schedulers 121 to advance their current generation tag, which results in the schedulers 121 issuing for execution Ops having the advanced current generation tag. In one embodiment, the current generation tag is updated by incrementing the tag in a wraparound fashion. Additionally, as described with respect to block 206 above, in response to some TC-changing events, the abort and exception handling logic 134 may abort instructions/Ops that are newer in program order than the instruction/Op causing the exception, in which case the tagged and stalled instructions that are dependent in their execution on the new TC will, advantageously, not be not speculatively executed.

FIG. 5 is a flow diagram illustrating operation of the core 100 of FIG. 1 in accordance with an embodiment of the present disclosure. The operation of the processor according to FIG. 5 is similar in many respects to operation according to FIG. 2. However, in the embodiment of FIG. 5, block 204 is replaced with block 504. At block 504, the PCL 132 prevents speculative execution of instructions that are dependent in their execution on the new TC (e.g., according to block 304 or 404) not only until instructions dependent in their execution on the old TC have completed execution, but until additional conditions are satisfied. In one embodiment, the additional condition is that no misses of the data cache 103 are outstanding. For example, assume a write-allocate type store Op misses in the data cache 103. Assume a request to fill the line of the data cache 103 implicated by the store Op address is pushed into a fill queue (not shown) in response to the cache miss and the store data is held in a store buffer entry awaiting the cache line fill. That is, the satisfaction of the data cache 103 miss is still outstanding. In such case, even if the store Op has been committed/retired, the PCL 132 still prevents speculative execution of the new TC-dependent instructions until the cache line fill completes such that the miss of the data cache 103 is no longer outstanding. In one embodiment, the additional condition is that no instructions associated with outstanding translation lookaside buffer (TLB) misses are present in the processor. For example, if a load/store Op causes a miss to occur in the DTLB 141, then the PCL 132 prevents new TC-dependent instructions from speculatively executing until TWE 145 performs a page table walk to update the DTLB 141. For another example, if an instruction fetch causes a miss to occur in the ITLB 143, then the PCL 132 prevents new TC-dependent instructions from speculatively executing until TWE 145 performs a page table walk to update the ITLB 143. Additionally, the PCL 132 may prevent new TC-dependent instructions from speculatively executing until all other operations associated with the instruction (e.g., cache miss satisfaction per above) are no longer outstanding. In one embodiment, both the additional conditions must be satisfied before the PCL 132 resumes speculative execution of instructions that are dependent in their execution on the new TC at block 206.

FIG. 6 is a flow diagram illustrating operation of the core 100 of FIG. 1 in accordance with an embodiment of the present disclosure. The operation of the processor according to FIG. 6 is similar in many respects to operation according to FIG. 2. However, in the embodiment of FIG. 6, block 204 is replaced with block 604. At block 604, the PCL 132 prevents not only speculative execution of instructions that are dependent in their execution on the new TC until instructions dependent in their execution on the old TC have completed execution, but also prevents speculative fetching of instructions until instructions dependent in their execution on the old TC have completed execution, e.g., the PCL 132 stalls the IFU 106. Speculative fetching of instructions means fetching of the instruction during a time when at least one instruction older in program order than the instruction being fetched has not completed execution such that a possibility exists that execution of the older instruction will eventually result in an abort of the instruction being fetched.

As may be observed from the foregoing, in a variety of SCAs, the attacker and victim are in a different privilege mode, operating system process and/or virtual machine, and the attacker process tries to quickly switch to a victim privilege mode, process or virtual machine and speculatively execute some of the victim's code before an abort terminates the speculative execution as mis-speculation. Preventing speculative execution from continuing across TC changes may significantly mitigate, and in some cases altogether defeat, some of these SCAs.

FIG. 7 is a flow diagram illustrating operation of the core 100 of FIG. 1 in accordance with embodiments of the present disclosure. Operation begins at block 702.

At block 702, an EU 114 detects that an instruction that is being speculatively executed causes an abort condition and signals the PCL 132. Examples of abort conditions include, but are not limited to, detection of a branch instruction mis-prediction, detection of a store dependence mis-prediction, other microarchitectural exceptions, some architectural exceptions, and interrupts. Operation proceeds to block 704.

At block 704, the PCL 132 asserts relevant flush signals to flush from the pipeline instructions and associated Ops that are newer in program order than the speculatively executed instruction that caused the abort condition. However, the PCL 132 allows execution to continue for instructions that are older in program order than the speculatively executed instruction that caused the abort condition. It is noted that for some of the older instructions the continued execution may be speculative execution.

The operation of FIG. 7 may be referred to as speculative flushing, which may be employed by a high-performance processor such as core 100. Speculative flushing may be contrasted with a processor that only flushes instructions in response to an abort condition caused by a non-speculatively executed instruction, e.g., the oldest instruction in the processor or a non-oldest instruction but for which older instructions no longer have the ability to cause an abort condition. A processor that performs speculative flushing may be more complex to design and therefore more prone to error and may require more chip area and/or power. However, speculative flushing generally has performance advantages.

Some abort conditions are relatively common and in fact designed into the processor. For example, core 100 includes branch predictors that predict the outcome of branch instructions. As described above, such predictions of branch instruction outcomes may greatly improve the performance of a superscalar pipelined speculative and out-of-order execution processor such as core 100 by allowing the front-end 110 to fetch instructions and the mid-end 120 to decode instructions so that the back-end 130 may receive dispatched Ops and be kept as busy as the parallelism of the program being executed will allow. However, detection of a branch mis-prediction is an example of an abort condition that may require instructions/Ops to be aborted.

Another example of an abort condition is detection of a store dependence mis-prediction, e.g., made by the MDP 111. A store dependence occurs when the source address of a load Op matches the destination address of a pending older store Op. If the MDP 111 predicts a store dependence, the store data associated with the store address may be forwarded to the load Op, e.g., from the store queue 125. Such predictions of store dependence may greatly improve the performance of a superscalar pipelined speculative and out-of-order execution processor such as core 100 by allowing the store data to be forwarded to the load Op, which avoids forcing the load Op to obtain the store data from the data cache 103 or from system memory, which may take significantly longer. Furthermore, the store dependence prediction may enable the DEC 112 to dispatch and the schedulers 121 to issue the load Op sooner than would otherwise be possible.

Recovering from a branch mis-prediction has an associated penalty in terms of flushing instructions that were fetched from the mis-predicted stream and re-fetching instructions from the correct stream and decoding them to dispatch Ops to the execution units. The penalty associated with a branch mis-prediction may be reduced by speculative flushing, since the front-end 110 and mid-end 120 may be able to begin predicting and fetching and decoding instructions sooner than in a processor that does not perform speculative flushing. Recovering from a store dependence mis-prediction has an associated penalty in terms of flushing all instructions that are dependent on the incorrectly forwarded store data and retrying/replaying them. The penalty associated with store dependence mis-prediction may be reduced by speculative flushing, since the back-end 130 may start the retrying/replaying sooner than in a processor that does not perform speculative flushing. The flushing is speculative because it may turn out that an instruction older than the speculatively executed instruction that caused the abort will later also cause an abort. However, in cases where there are no abort conditions caused by older instructions, then the associated penalties may be reduced.

Generally speaking, embodiments described herein may mitigate a class of attack in which attacker code opens or starts a window of speculation and extends it into victim code by jumping/calling to the victim code, resulting in the victim code also being speculatively executed. The attacker code typically includes some instructions prior to jumping/calling to the victim code that will have a long latency to resolve in order to maximize the duration of the speculation window. If the jump/call to the victim code involves a TC change, the embodiments may mitigate the effectiveness of the attack by preventing speculative execution of the victim code until instructions of the attacker code have completed execution, by which time subterfuges of the attacker code (e.g., predictors mis-trained by the attacker code or memory access permission violations by the attacker code) may be discovered, resulting in the victim code being flushed rather than speculatively executed.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor, comprising:
a translation context (TC) that is a function of an address space identifier (ASID), a virtual machine identifier (VMID), and/or a privilege mode (PM) of the microprocessor, wherein the microprocessor uses the TC to perform physical address translations;
a back-end that speculatively executes instructions out of program order; and
a decode unit that:
dispatches instructions in program order to the back end; and
in response to decoding a TC-changing instruction, stalls dispatching instructions younger in program order than the TC-changing instruction until all instructions older in program order than the TC-changing instruction have completed execution, to mitigate side channel attacks.

2. The microprocessor of claim 1,
wherein the microprocessor, while the decode unit is stalled and in response to determining that one of the instructions older in program order than the TC-changing instruction is a source of mis-speculation, aborts the instructions younger in program order than the TC-changing instruction to prevent speculative execution thereof.

3. The microprocessor of claim 2,
wherein speculative execution of an instruction comprises execution of the instruction during a time when at least one instruction older in program order than the instruction has not completed execution such that a possibility exists that execution of the older instruction would result in an abort of the instruction.

4. The microprocessor of claim 2,
wherein the one of the instructions older in program order than the TC-changing instruction that is a source of mis-speculation comprises a mis-predicted branch instruction.

5. The microprocessor of claim 2,
wherein the one of the instructions older in program order than the TC-changing instruction that is a source of mis-speculation comprises an instruction that causes a memory protection violation.

6. The microprocessor of claim 2,
wherein the one of the instructions older in program order than the TC-changing instruction that is a source of mis-speculation comprises a load instruction subject to a store dependence mis-prediction.

7. The microprocessor of claim 1, further comprising:
pipeline control logic, coupled to the decode unit, that receives a signal indicating a TC change event and, in response, signals the decode unit to stall dispatching instructions to the back-end until all instructions that have been issued for execution have completed execution.

8. The microprocessor of claim 7,
wherein the TC change event comprises an interrupt request.

9. The microprocessor of claim 7,
wherein the TC change event comprises detection of an exception caused by execution of an instruction.

10. A method, comprising:
in a microprocessor comprising:
a translation context (TC) that is a function of an address space identifier (ASID), a virtual machine identifier (VMID), and/or a privilege mode (PM) of the microprocessor, wherein the microprocessor uses the TC to perform physical address translations;
a back-end that speculatively executes instructions out of program order; and
a decode unit:
dispatching, by the decode unit, instructions in program order to the back end; and
in response to the decode unit decoding a TC-changing instruction:
stalling dispatching instructions younger in program order than the TC-changing instruction until all instructions older in program order than the TC-changing instruction have completed execution, to mitigate side channel attacks.

11. The method of claim 10, further comprising:
while the decode unit is stalled and in response to determining that one of the instructions older in program order than the TC-changing instruction is a source of mis-speculation:
aborting the instructions younger in program order than the TC-changing instruction to prevent speculative execution thereof.

12. The method of claim 11,
wherein speculative execution of an instruction comprises execution of the instruction during a time when at least one instruction older in program order than the instruction has not completed execution such that a possibility exists that execution of the older instruction would result in an abort of the instruction.

13. The method of claim 11,
wherein the one of the instructions older in program order than the TC-changing instruction that is a source of mis-speculation comprises a mis-predicted branch instruction.

14. The method of claim 11,
wherein the one of the instructions older in program order than the TC-changing instruction that is a source of mis-speculation comprises an instruction that causes a memory protection violation.

15. The method of claim 11,
wherein the one of the instructions older in program order than the TC-changing instruction that is a source of mis-speculation comprises a load instruction subject to a store dependence mis-prediction.

16. The method of claim 10, further comprising:
receiving, by pipeline control logic coupled to the decode unit, a signal indicating a TC change event and, in response, signaling the decode unit to stall dispatching instructions to the back-end until all instructions that have been issued for execution have completed execution.

17. The method of claim 16,
wherein the TC change event comprises an interrupt request.

18. The method of claim 16,
wherein the TC change event comprises detection of an exception caused by execution of an instruction.

19. A non-transitory computer-readable medium having instructions stored thereon that are capable of causing or configuring a microprocessor comprising:
a translation context (TC) that is a function of an address space identifier (ASID), a virtual machine identifier (VMID), and/or a privilege mode (PM) of the microprocessor, wherein the microprocessor uses the TC to perform physical address translations;
a back-end that speculatively executes instructions out of program order; and
a decode unit that:
dispatches instructions in program order to the back end; and
in response to decoding a TC-changing instruction, stalls dispatching instructions younger in program order than the TC-changing instruction until all instructions older in program order than the TC-changing instruction have completed execution, to mitigate side channel attacks.

20. The non-transitory computer-readable medium of claim 19,
wherein the microprocessor, while the decode unit is stalled and in response to determining that one of the instructions older in program order than the TC-changing instruction is a source of mis-speculation, aborts the instructions younger in program order than the TC-changing instruction to prevent speculative execution thereof.

* * * * *